MANUFACTURE OF OIL-FILLED ELECTRIC CABLES

Original Filed Nov. 3, 1965

United States Patent Office

Re. 27,181
Reissued Sept. 21, 1971

27,181
MANUFACTURE OF OIL-FILLED ELECTRIC CABLES

Maurice Dudley Lambert, Fairoak, Eastleigh, England, assignor to Pirelli General Cable Works Limited, London, England Original No. 3,455,347, dated July 15, 1969, Ser. No. 506,209, Nov. 3, 1965. Application for reissue Feb. 24, 1970, Ser. No. 13,740
Claims priority, application Great Britain, Nov. 5, 1964, 45,115/64
Int. Cl. B65b *31/04, 1/04*
U.S. Cl. 141—65 4 Claims

Matter enclosed in heavy brackets [ ] appears in the original patent but forms no part of this reissue specification; matter printed in italics indicates the additions made by reissue.

ABSTRACT OF THE DISCLOSURE

In evacuated sheathed electric cables, air from the atmosphere has a tendency to leak in between the cable end plug and surrounding sheath. This is prevented in the present invention by a guard system which is clamped on and around the sheath covering the end plug. The guard system includes a vacuum line passing through the sheath into an annular guard-ring formed in the plug where such air collects, and a packing element and external surrounding shield through which the vacuum line is passed.

This invention relates to the manufacture of oil-filled electric cables and more particularly to the manufacture of such cables by the post- or vacuum-impregnation technique described in [copending United States application Ser. No. 307,486] *United States Pat. No. 3,444,016.*

In post-impregnation the cable core is dried and sheathed under vacuum with subsequent impregnation of the core by the oil, as distinct from the mass-impregnation technique where the core is impregnated before sheathing. [Application No. 307,486] *Pat. No. 3,444,-016* describes a sequence of steps for carrying out post-impregnation wherein the leading end of the sheath is plugged in order to prevent ingress of air from the atmosphere and maintain the vacuum within the sheath carrying the cable core.

The plug disclosed in [application No. 307,486] *Pat. No. 3,444,016* includes a pair of O-rings for providing a seal between the cylindrical surface of the plug and the interior surface of the sheath, the O-rings fitting into circumferential grooves in the plug surface and being made of a suitable resilient material. Between the pair of O-rings is provided a vacuum guard-ring, an internal passageway extending longitudinally within the plug from the guard-ring to another aperture onto which a vacuum source can be applied. This aperture is located in the forward end of the plug beyond the sheath termination. Thus any air penetrating past the forward O-ring is removed before it can reach the main body of the evacuated sheathed cable.

A similar plug can be used at the trailing end of the cable.

As will be appreciated from the foregoing discussion the construction of the plug is an important feature of the post-impregnation technique. In [application No. 307,-486] *Pat. No. 3,444,016* the plug contains a further valved longitudinal bore through which the impregnating oil can be subsequently introduced into the evacuated core.

A common feature of all the plug designs suggested to date is the use of a pair of O-rings with intermediate vacuum guard-ring. Equally well, it is important to simplify the design of the plug and to render it as far as possible useful with a range of cable sizes.

The present invention is accordingly directed to an improved vacuum guard system of universal application; and to this end it provides for any air leaking past the forward O-ring to be withdrawn from the guard-ring through the wall of the sheath rather than through the plug.

The present invention therefore provides a method of preventing ingress of air into an evacuated system comprising a sheathed cable core closed by an end plug surrounded by the sheath and including a vacuum guard ring, the method comprising the steps of forming an aperture in the wall of the sheath adjacent the vacuum guard ring connecting a vacuum line to the guard ring through the aperture and sealing the sheath around the inserted line.

Apparatus provided by the present invention for carrying out this method may comprise a shield through which the vacuum line passes, a packing element shaped to conform with the sheath contour and means for clamping the shield to the sheath with the packing element interposed inbetween. Conveniently the clamping means consists of one or more metallic bands which extend around the sheath, each band including a tensioning device whereby a tight grip can be provided by adjustment of the total band length. Such tensioning device also enables the apparatus to be used for cables of varying sizes.

Examples of such clamping means are well-known "jubilee" or "invicta" clips.

Again, it is preferred that the shield be in the form of a metal plate shaped to conform with the sheath contour with a packing element of uniform thickness composed of flexible rubbery material which will automatically adopt the sheath contour when the plate is clamped into position. The vacuum line passes through both the plate, being securely fixed thereto as by welding, and the packing element, protruding from the latter just sufficiently to engage the aperture in the sheath. The aperture in the sheath is made by any convenient means depending on the material of the sheath, usually lead or aluminium, once the plug is in situ.

In a modification of the apparatus described above the vacuum line is in the form of hypodermic needle slidable within the shield, with a solid tip and longitudinal bore terminating in a side-opening near the tip. In this embodiment the needle itself forms the aperture in the sheath, the side-opening being sufficiently near the tip so as to be positioned within the guard-ring once the needle has penetrated.

An example of apparatus constructed according to the present invention will now be described with reference to the accompanying drawing, in which.

Figure 1:
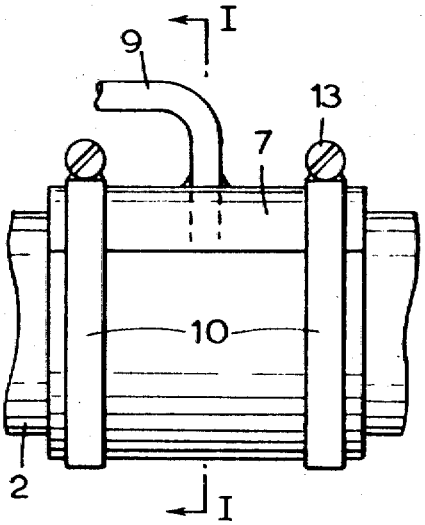
FIG. 1 represents a side-view of a sheathed cable with vacuum guard apparatus secured thereto.
Figure 2:
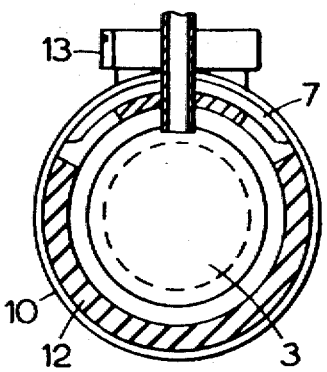
FIG. 2 represents a transverse cross-sectional view through the sheathed cable, in the direction I—I of FIG. 1.
Figure 3:
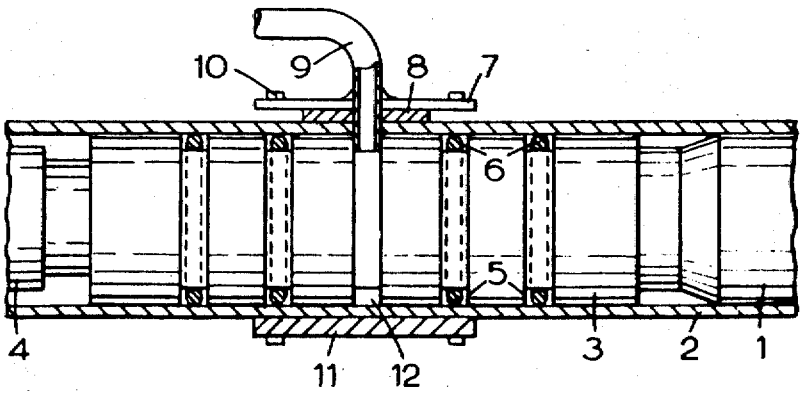
FIG. 3 represents a longitudinal cross-sectional view through the sheathed cable of FIG. 1.

Referring to the drawing, there is shown an evacuated system comprising a cable core 1 secured to an end-plug 3 with both core and plug surrounded by a lead sheath 2 applied by extrusion in the normal manner. To the far end of plug 3 is secured hawser 4 for pulling the cable core through the extrusion press and supplying heating current for drying purposes in the known manner.

Plug 3 includes a circumferential vacuum guard-ring 12 and, located on either side of the guard-ring, pairs of O-rings 6 housed in circumferential grooves 5.

Vacuum line 9 leading to vacuum pump (not shown) s soldered or otherwise jointed to curved metal plate 7 :onstituting a shield, the line passing through the plate ınd protruding sufficiently on the concave side thereof o pass through aperture 14 in the sheath wall into the ;uard-ring 12.

Between the plate 7 and the sheath wall is interposed ›acking 8, As will be noted from the drawing both the ›acking 8 and plate 7 conform to the sheath contour to ıssist the formation of a tight seal between the vacuum ine and the sheath wall.

Plate 7 is clamped to the sheath by metal bands 10 ensioned by screws 13 in the manner of a "jubilee" :lip. A further rubber packing 11 is interposed between he bands and the sheath around the remainder of its :ircumference not straddled by plate 7, in order to avoid lamaging the lead sheath (lead being a relatively soft naterial) on tightening of the clips.

It will be appreciated from the above that the present nvention enable the construction of the cable end plug :o be simplified, as well as providing a vacuum guard ıpparatus which may be employed with cables of a variety of diameters.

What I claim is:

1. Apparatus for preventing ingress of air into an evacuated system which includes a cable core that is secured to an end plug wherein both said core and said end plug are surrounded by a sheath, the apparatus comprising a vacuum guard ring, vacuum line means adapted for fluid communication with said vacuum guard ring, shield means through which said vacuum line means is passed, said shield means and said vacuum line means having sealing means interposed therebetween to provide a vacuum-tight seal between said vacuum line means and said shield means, and means for clamping the shield means to said sheath means, said shield means and sheath means having packing means interposed therebetween which packing means is shaped to conform to the contour of said sheath means.

2. The apparatus of claim 1 wherein the clamping means includes at least one metallic band means extending around said sheath means, said band means additionally comprising tensioning means which enables the adjustment of the length of said band means whereby a tight fit may be achieved.

3. The apparatus of claim 1 additionally comprising means for forming an aperture in the wall of said sheath.

4. The apparatus of claim 1 wherein the vacuum line means includes a solid tip capable of puncturing said sheath and slidable within said shield means, said vacuum line means further including a side opening therein, said side opening being positioned so as to be in communication with said guard-ring one said sheath means has been punctured by said solid tip means.

References Cited

The following references, cited by the Examiner, are of record in the patented file of this patent or the original patent.

UNITED STATES PATENTS 3,248,118 4/1966 Pechy ---------- 277—1

HOUSTON S. BELL, Jr., Primary Examiner

U.S. Cl. X.R.

141—330; 285—197